United States Patent
Chang et al.

(10) Patent No.: US 7,451,313 B1
(45) Date of Patent: Nov. 11, 2008

(54) ENCRYPTION METHOD OF APPLICATION SOFTWARE

(75) Inventors: Zechary Chang, Taipei (TW); Harry Han, Beijing (CN)

(73) Assignee: Inventec Corporation, Taipei (TW)

( * ) Notice: Subject to any disclaimer, the term of this patent is extended or adjusted under 35 U.S.C. 154(b) by 803 days.

(21) Appl. No.: 11/013,738

(22) Filed: Dec. 17, 2004

(51) Int. Cl.
*H04L 9/00* (2006.01)

(52) U.S. Cl. ...................... 713/168; 713/189
(58) Field of Classification Search ............... 713/168, 713/170, 189; 726/27–31; 705/56–59
See application file for complete search history.

(56) References Cited

U.S. PATENT DOCUMENTS 5,457,746 A * 10/1995 Dolphin ................... 705/51

* cited by examiner

*Primary Examiner*—Hosuk Song
(74) *Attorney, Agent, or Firm*—Rabin & Berdo, P.C.

(57) ABSTRACT

An encryption method for protecting application software is to first fetch a unique identification code of the application software at the user site. Then, transfer the unique identification code to a server for registration. The server operates according to the unique identification code and the current date information and generates a starting password. The starting password is transferred to the user for starting the application software. The encryption is made by applying a password from the website server based on a unique identification code and on-line verification.

7 Claims, 4 Drawing Sheets

ENCRYPTION METHOD OF APPLICATION SOFTWARE

FIELD OF THE INVENTION

The invention generally relates to an encryption method, and in particular relates to an encryption method of application software.

BACKGROUND OF THE INVENTION

In the "information" era, software is a kind of intelligence achievement, an invisible property, and significant to the information management and development of enterprise. Along with the considerable developments in the information security domain and the network security domain, software sold through network downloadable is broadly applied. Regardless of being a network downloadable software, or software sold in the market, how to encrypt the software and prevent it from being cracked and decrypted so as to keep the rights of the developer is the major development direction of current software encryption technology. Now, what have to be obtained are the methods to prevent any unauthorized user to access the resource, to confirm the user's status and to prevent other people reaching the security information and taking illegal uses.

Currently many network downloadable software have a free trial period, for example 30 days or uses. After the expired time, one has to pay and obtain the starting password. After entering the password, the user can continue to use the software. This is a popular manner of selling software through a network.

The conventional network downloadable software usually recognizes whether the software has been legally started or has exceeded the free trial period via a file or a tag installed in the operating system. For example, an "ini" file generated under the Windows system directory includes date information of the downloadable software, or date information written in the Windows registration table. Usually this kind of information is not created in the installation process, therefore reinstalling the downloadable program certainly cannot change the record. Only reinstalling the Windows system, or even re-formatting the entire hard disk, can erase it. However, if the user can find the file or the tag, and modify the date information, then he or she is always free to use, and never exceeds the trial period.

Moreover, because the passwords are generated by a certain algorithm, they are always valid for the released software to check passwords with the algorithm. So long as a password of the software being publicly disclosed, the encryption can no longer protect the software.

Therefore, how to provide a new method that carries on a strict certification to the user status, provides the user safe, reliable software contents while protects the software developer's rights, is a problem in the current software encryption technology that has to be solved urgently.

SUMMARY OF THE INVENTION

In view of the aforesaid problem, the invention provides an encryption method for protecting application software. The major object is to enhance the security and reliability of the encryption system. It strictly confirms the validity of user and prevents the password from illegal use.

To reach the above object, the invention provides an encryption method for protecting application software. Based on a unique identification code of a user, a website server generates an immediate password and on-line confirm the validity of the application software. It first fetches a unique identification code of the application software at the user site, then, transfers the unique identification code to the server for registration. The server operates according to the unique identification code and the current date, generates a starting password, and transfers the starting password to the user. The user then uses the starting password to start the application software.

According to the encryption method of the invention, different passwords are generated based on different user conditions. The starting date is bundled into the password in an encryption format. Therefore, even if the user finds the starting information file or record, he or she is unable to modify the starting date. Moreover, the password is not permanently valid. An expired password will not be useful. Therefore, the software right can be better protected.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

In the conventional encryption software development, each developer uses her specific encryption algorithm, and pays attention on how to prevent others from decryption or tracking of the encryption. The algorithm generally has some problems, for example, the passwords rely on the algorithms only, so the algorithm becomes the target of attacks. The algorithm can be tracked and cracked. The encryption algorithms are irregular, have not been well verified to guarantee their encryption capabilities. A highly capable algorithm is often complicated and inefficient to operate. When a participator of the algorithm developer discloses the algorithm, the entire encryption system will fail.

Figure 1:
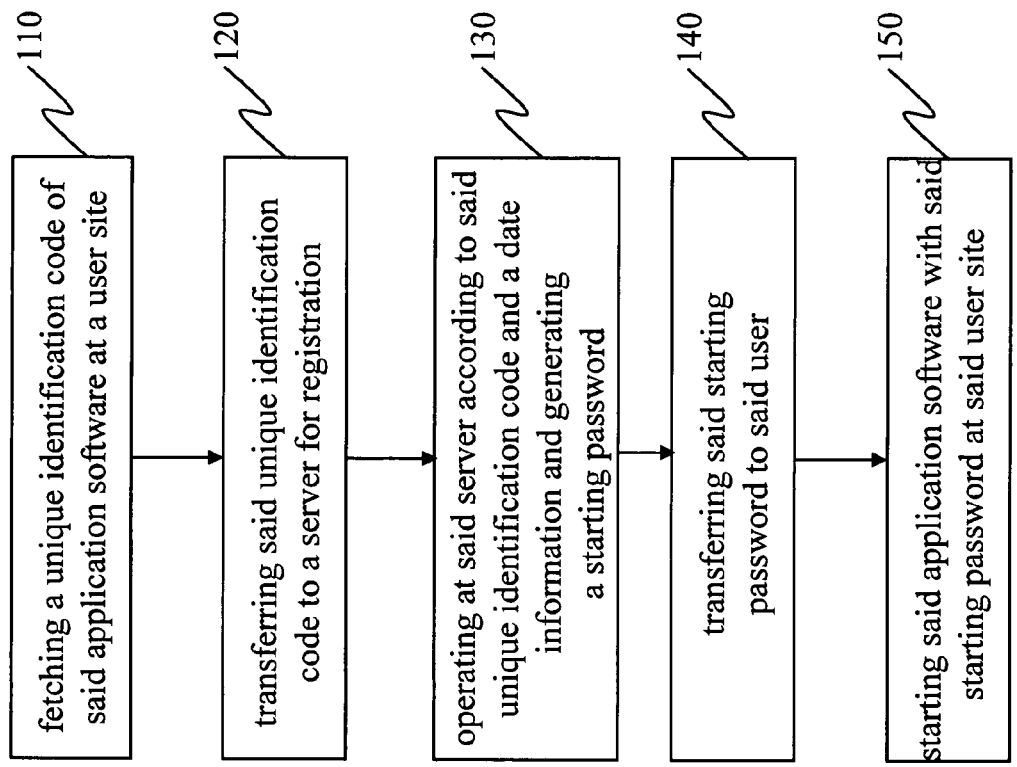
FIG. 1 is an overall flowchart of an encryption method of the invention for protecting network downloadable software.

The overall flowchart of an encryption method of application software according to the invention is illustrated in FIG. 1. First fetching a unique identification code of the application software at the user site (step 110). Then, transfers the unique identification code to a server for registration (step 120). The server operates according to the unique identification code and the current date for generating a starting password (step 130). Transferring the starting password to the user (step 140). The user then starts the application software by entering the starting password (step 150).

The encryption method of the invention will be further described below by an example of marketed software.

The invention first takes a unique identification code. The unique identification code may have several possibilities. For example, the hard disk serial number, the current user identity, the user's network card number and so on. These are basic information that are usually obtained and stored by the operation system. However, since the system can get some information from a certain record position without the need of entering each time, if an illegal user changes the parameter to be same with a validated user's parameter, then some kinds of information cannot validly protect the software from illegal use.

An embodiment of a unique identification code is the software serial number. The user can simultaneously obtain a serial number when purchasing the software. Each software pack can have a unique serial number for the protective purpose. When releasing and selling the software, a serial number identifies each software pack. In the encryption method of application software according to the invention, after completing the software installation, the user has to enter a starting password to start using the software.

Figure 2:
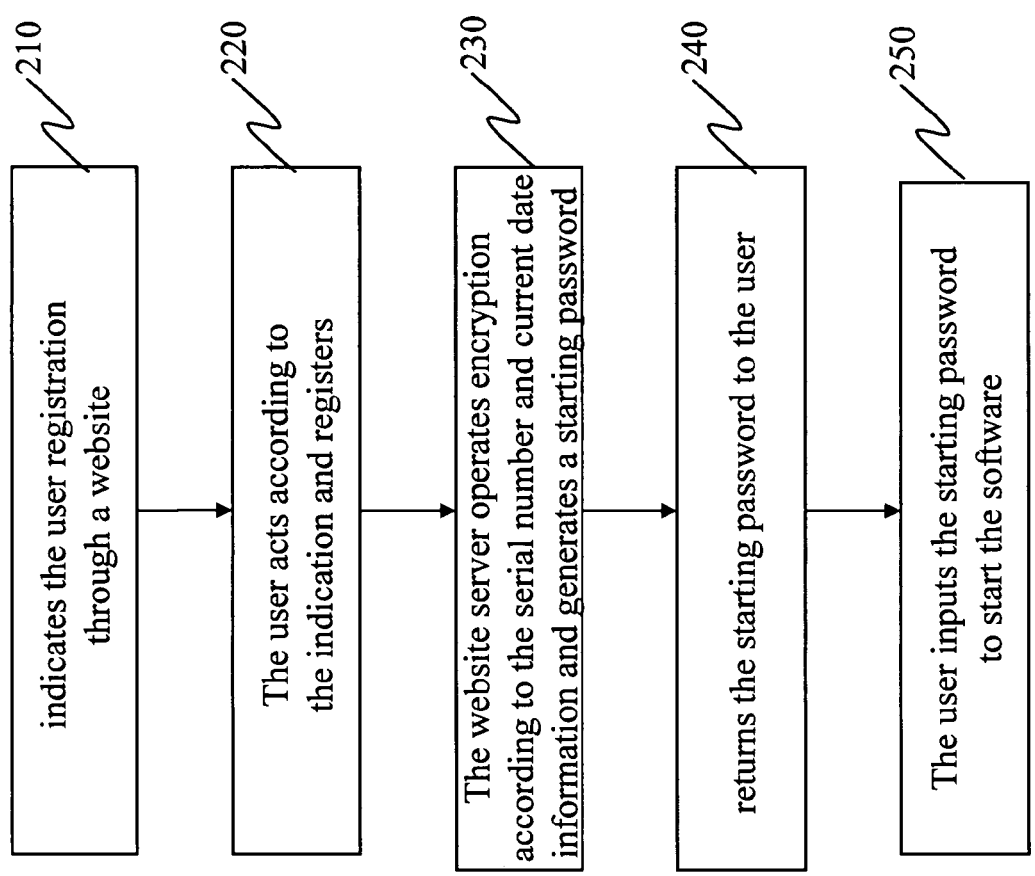
FIG. 2 is an operation flowchart of a first embodiment of the invention.

The process of generating a password is shown in FIG. 2, which is flowchart of a first embodiment of the invention. First it indicates the user to use the software serial number for registration through a website (step 210). The user acts according to the indication and registers (step 220). The system verifies the registered user. It does not permit repetitive registration. For a user who repeats to register, the system indicates the user no need to register. The server judges the times of registration of the same account number, if detecting the registration account number being massively used, then it terminates the registration of that serial number account to prevent the serial number being stolen. The website server operates encryption according to the serial number and current date information and generates a starting password (step 230). It returns the starting password to the user (step 240). The user gets the starting password, inputs it to start the software (step 250).

Figure 3:
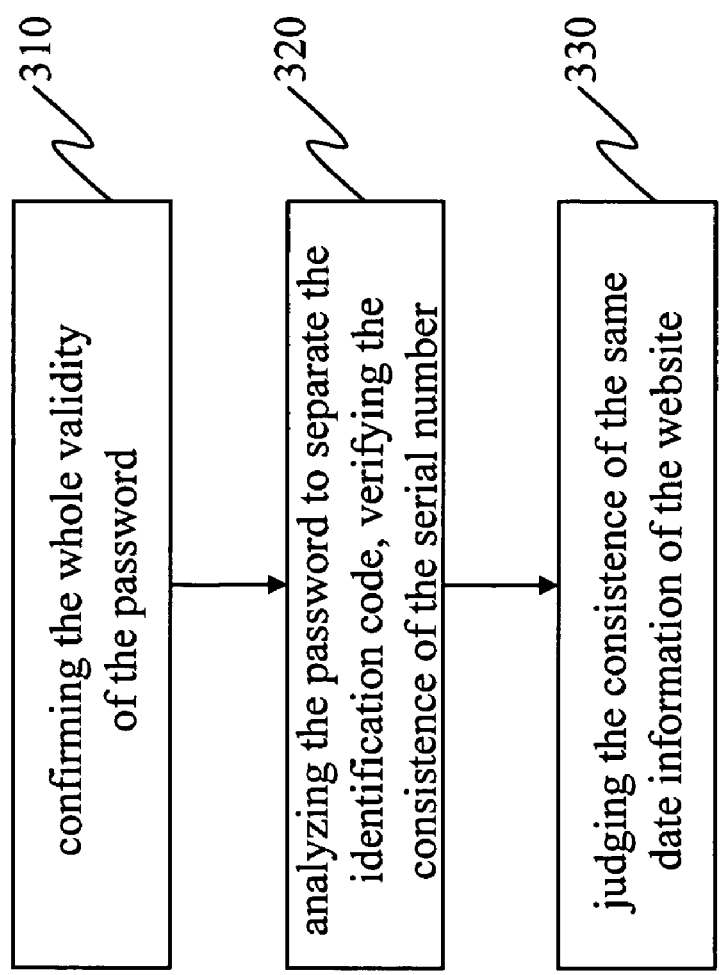
FIG. 3 is a flowchart of password confirmation in the invention.

The software starts by verifying the starting password. FIG. 3 is a flowchart of process of password verification in the invention. First confirming the whole validity of the password (step 310). Then, analyzing the password to separate the identification code (software serial number) from the password, verifying the consistence of the serial number with the user's input (step 320). Again separating time information from the password, judging the consistence of the same date information of the website, or within a permissive time range (for example, 3 days) (step 330). The permissive time range is defined by the software developer for preventing a valid password from being spread. If a serial number being cracked, the valid password taken by an illegal user can only be used in a short time (predetermined by the software developer) to pass the password verification. Only if the above judgment conditions all pass, the password can pass the verification. If any condition does not pass, then the password is invalid. After verifying the password, the application software can start to run.

The invention is applicable to network downloadable software and meets the requirements of currently increasing sharewares. It provides the software developers a convenient, quick, safe, and highly effective software release manner. The invention achieves managements of restriction to the trail version of software as well as the control of user registration.

Figure 4:
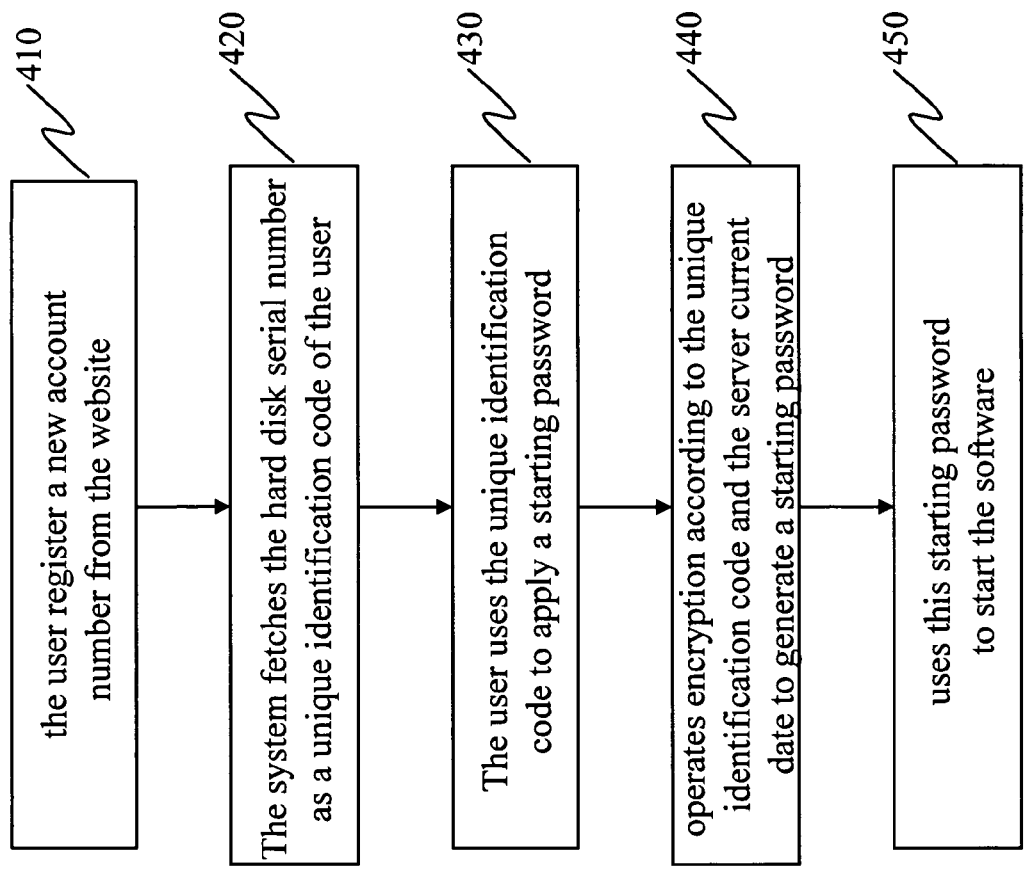
FIG. 4 is an operation flowchart of a second embodiment of the invention.

FIG. 4 shows the operation flowchart of a second embodiment of the invention. After a website downloadable software being installed and initiated, the software first checks whether the user has a password to start, if the program has been started with password, it goes ahead. Otherwise, the user has to register a new account number from the website (step 410). The system fetches the hard disk serial number as a unique identification code of the user and provides to the user (step 420). The user uses the unique identification code to apply a starting password (step 430). The website server checks whether the account number being massively used or incomplete in payment. If the account number is massively used, it identifies the illegal user. If the user has not finished the payment, the operation cannot continue. If the above examination conditions all pass, the website sever operates encryption according to the unique identification code and the server current date to generate a starting password (step 440), and provides the starting password to the user. The user then uses this starting password to start the software (step 450).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An encryption method of application software through applying a password from a website server based on a unique identification code and on-line verification, comprising the steps of:
   fetching a unique identification code of said application software at a user site;
   transferring said unique identification code to a server for registration;
   operating at said server according to said unique identification code and a date information and generating a starting password;
   transferring said starting password to said user;
   analyzing said starting password and verifying validity of said password, comprising the steps of:
      extracting date information in said password;
      comparing deviation of said date information to current date; and
      determining a valid time information when said deviation is less than a predetermined time, and determining an invalid time information when said deviation is larger than said predetermined time; and
   starting said application software with said starting password at said user site.

2. The encryption method of claim 1 wherein said step of registration at said sever comprises a step of judging whether said unique identification code being used over a predetermined times.

3. The encryption method of claim 1 wherein said application software is a marketed software.

4. The encryption method of claim 1 wherein said application software is a network downloadable software.

5. The encryption method of claim 1 wherein said date information is a system current date at said website server.

6. The encryption method of claim 1 wherein said step of verifying validity of said password further comprises the step of checking validity of said identification code.

7. The encryption method of claim 1 wherein said unique identification code is chosen from the group consisting of software serial number, user's hard disk number and user's network card number.

* * * * *